(12) United States Patent
Jamali et al.

(10) Patent No.: US 6,854,008 B1
(45) Date of Patent: Feb. 8, 2005

(54) AUTOMATICALLY UPLOADING AND ORGANIZING DOCUMENTS IN A DOCUMENT SERVER

(75) Inventors: Hamadi Jamali, Redwood City, CA (US); Ivan Bojer, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 09/695,810

(22) Filed: Oct. 24, 2000

(51) Int. Cl.[7] ............................. G06F 15/16; G09G 15/00
(52) U.S. Cl. ........................ 709/219; 715/530; 715/539
(58) Field of Search ................................ 709/203, 217, 709/219, 204, 205, 245; 715/513, 530, 539; 707/10; 345/760

(56) References Cited

U.S. PATENT DOCUMENTS

| | | | | |
|---|---|---|---|---|
| 4,571,699 A | * | 2/1986 | Herzog et al. | 358/408 |
| 5,659,639 A | * | 8/1997 | Mahoney et al. | 382/309 |
| 5,692,073 A | * | 11/1997 | Cass | 382/219 |
| 6,297,824 B1 | * | 10/2001 | Hearst et al. | 345/848 |
| 6,336,124 B1 | * | 1/2002 | Alam et al. | 715/523 |
| 6,486,895 B1 | * | 11/2002 | Robertson et al. | 345/776 |
| 6,563,598 B1 | * | 5/2003 | Johnson et al. | 358/1.15 |

* cited by examiner

Primary Examiner—William Cuchlinski
Assistant Examiner—Yemane M. Gerezgiher
(74) Attorney, Agent, or Firm—Fitzpatrick, Cella, Harper & Scinto

(57) ABSTRACT

A computer implemented method, system, and computer-readable medium for modifying and creating networked documents (105). To create a document (105), the method includes the acts of reading a control sheet (340), reading a content sheet (340), and generating the document (350, 360) using the control sheet (405) and the content sheet (407). To modify a document (105), the method includes the acts of reading a control sheet (405) having commands, reading a content sheet (407) having content (340), retrieving the document (105) using a command from the command sheet (350); and modifying the document using the control sheet (405) and the content sheet (350). The content sheet includes content of the document (105) and the control sheet (405) specifies the location of the content on the Web page. Either or both of the control sheet (405) and content sheet (407) may include print content.

14 Claims, 4 Drawing Sheets

AUTOMATICALLY UPLOADING AND ORGANIZING DOCUMENTS IN A DOCUMENT SERVER

FIELD OF THE INVENTION

This invention pertains to the field of document processing and storage, and more particularly to the field of network-based document creation and modification.

DESCRIPTION OF BACKGROUND ART

The use of the Internet and the World Wide Web (WWW) has become widespread recently. For example, people use the WWW to find information, share resources, and research topics relating to their work. Setting up a document server, uploading data into it, organizing a this data in a suitable manner, building the desired links among the different data, building the desired links to other data in other document servers, maintaining the document server, and updating it as needed are difficult tasks. These tasks are currently performed by a trained professional "Webmaster" only. In addition, building a Web site is an ongoing process that requires long-term editorial management and technical maintenance. This requires the services of the professional Webmaster to be available for the duration of the life of the document server.

Thus, what is needed is an apparatus, method, and computer-readable medium that allows people to create and modify content that is stored on the WWW without use of a Webmaster.

DISCLOSURE OF INVENTION

The present invention includes a computer implemented method for creating a networked document, the method including the steps of: reading a control sheet (340); reading a content sheet (340); generating the document using the control sheet and the content sheet (350); and storing the document to the network (360). The control sheet identifies content in the control sheet to add to the document. In some embodiments, either or both of the control sheet (405) and content sheet (407) is or are print pages.

The present invention includes a computer implemented method for modifying a networked document, the method including the steps of: reading a control sheet (340), where the control sheet includes commands to modify the document; reading a content sheet (340), where the content sheet includes information to add or remove from the document; retrieving the document (350); modifying the document using the control sheet and the content sheet (350); and storing the document to the network (360). In some embodiments, either or both of the control sheet 405 and content sheet 407 is or are print pages.

The present invention will be more fully understood in light of the following detailed description taken together with the accompanying drawings.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Embodiments of the present invention provide a system that allows multiple users to access and modify a document 105 that is available on the WWW or any network. The shared document 105 can be, for example, an HTML coded web page. A first embodiment of the present invention uses a personal computer (PC) 106 connected to the network 108 to create and modify shared documents 105. The second and third embodiments use a modified document processor 402, such as a scanner or photocopier, connected to network 108 to create and modify shared documents 105. The second and third embodiments are suited for appliances that do not have an extended user interface as typically used with a conventional personal computer.

One advantage of embodiments of the present invention is that Web pages can be created and modified by people that lack knowledge of Internet-based document coding languages. Thus administrators with understanding and ability to program in Internet-based coding languages are not necessary to create and modify Internet-based documents. Accordingly, the speed at which Internet-based documents can be created and modified is increased.

First Embodiment

Figure 1:
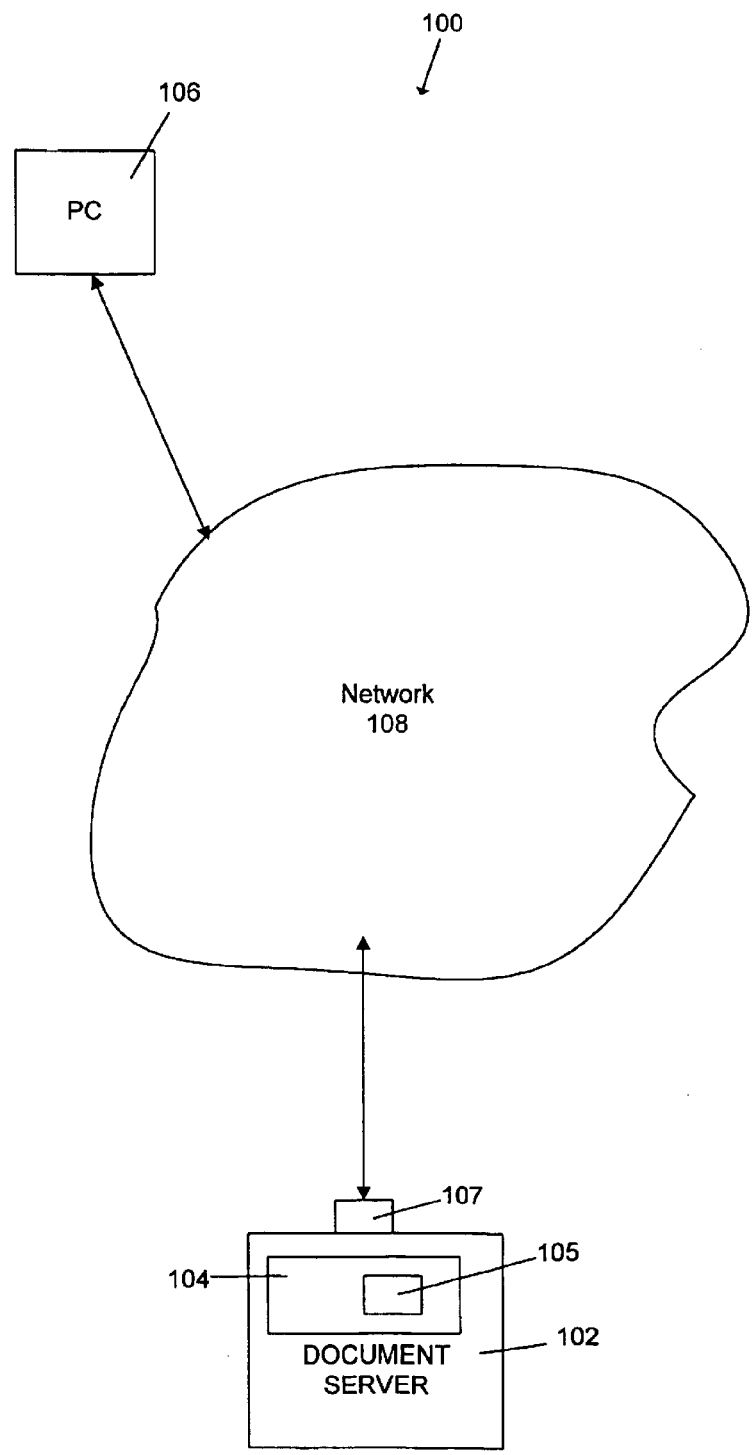
FIG. 1 depicts a block diagram of a suitable shared document management system 100 in accordance with an embodiment of the present invention.

FIG. 1 depicts a block diagram of a suitable shared document management system 100 in accordance with a first embodiment of the present invention. In one embodiment, system 100 includes a document server 102 interconnected to personal computer (PC) 106 using a network 108 (such as the Internet or any network of interconnected computers) and, for example, the TCP/IP protocol. Document server 102 may be any conventional computer that includes a CPU, memory 104, and an input/output (I/O) device 107. A suitable document server 102 may be, for example, a server available from SUN Microsystems. Personal computer 106 may be any conventional computer that includes a CPU, memory, I/O device, and visual display device.

In one embodiment, document server 102 stores document 105 in memory 104 and allows users of personal computer 106 to modify or post new documents to the memory 104 of document server 102 in accordance with process 200 described below with respect to FIG. 2. The document 105 may be, for example, Web pages. In one embodiment, personal computer 106 provides users visual access to document 105 stored by document server 102 by executing a Web browser such as Netscape Navigator. In one embodiment, document server 102 and personal computer 106 execute software to provide the process 200, described below, but embodiments of the present invention can be implemented in hardware and/or firmware.

Figure 2:
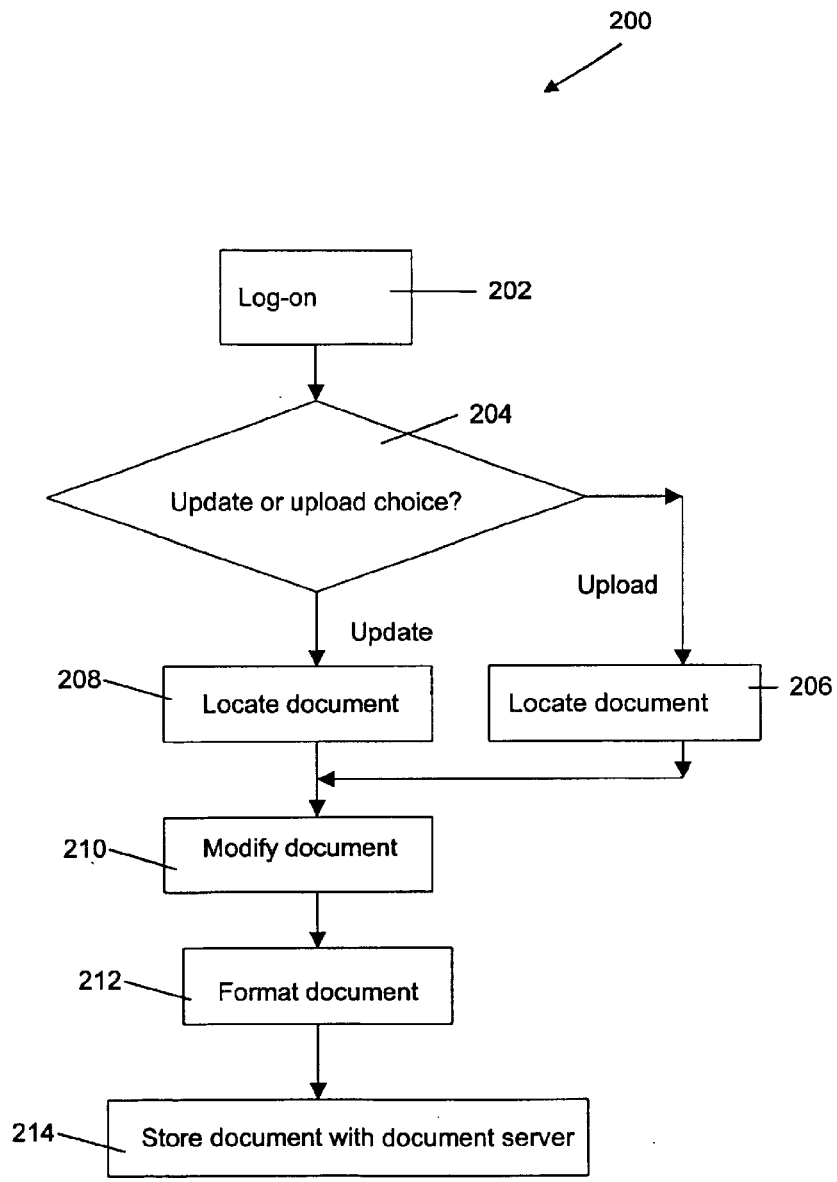
FIG. 2 depicts a process 200 in accordance with an embodiment of the present invention.

FIG. 2 provides a flow diagram that represents a process 200 performed by document server 102 and personal computer 106 (document server 102 and personal computer 106 communicate using network 108) in accordance with an embodiment of the present invention.

Process 200

In step 202, a user provides a universal resource locator (URL) to the Web browser of personal computer 106 to request access to a document 105 in memory 104 of document server 102. The document server 102 verifies whether the user is allowed to access document 105. For example, the user is asked a series of questions to ensure that he has the correct credentials for updating document 105 in memory 104 or adding new documents to memory 104. If the user passes all the tests of step 202, the Web browser displays the requested document along-side graphical buttons labeled "UPDATE" and "UPLOAD". If the user fails any test of step 202, the user is merely allowed to view document 105 in memory 104.

In step 204, the user chooses whether to update a document in memory 104 or upload a lisp document to memory 104. If the user chooses to upload a new document to the document server 102, then step 206 follows; otherwise step 208 follows.

In step 206, the Web browser queries the user for the location of the document to upload. For example, the document can be stored on a storage disk on the user's personal computer 106, a storage disk in another personal computer 106, or the document can be read from a scanner peripheral to the personal computer 106. The user can either type in the desired storage location or use the Web browser to browse for it.

After the personal computer 106 locates the document to be uploaded, the personal computer 106 loads the computer coded version of the document, e.g., HTML, into the memory 104 of the document server 102. If the document to be stored in memory 104 is read from a scanner peripheral to the user's personal computer 106, the personal computer creates a computer coded version, e.g., HTML or JPEG, of the document. Step 212 follows. Step 210 follows step 206.

If the user chooses to update an existing document 105 in step 204, then in step 208, the Web browser of the personal computer 106 prompts the user to identify the document in memory 104 to update.

In step 210, the Web browser displays functions to apply to modify the document located in step 208 ("selected document"). The functions include, but are not limited to: 1) insert a new hyperlink into the selected document, 2) delete a hyperlink from this selected document, 3) delete the selected document, 4) delete a page or pages (e.g., text and/or graphics) from the selected document, 5) insert a page or pages into the selected document, and 6) change or set the style of the selected document. For example, where the document to be modified is a web page written in HTML, the conventional program would identify and modify or add, as the case may be, HTML code in the document. In connection with some functions, the user provides information that is to be added to or deleted from the selected document as well as information necessary to properly place or remove information in the selected document.

In step 210, the user may choose from other functions related to the relationship of the selected document to other documents stored by the document server 102 such as: 1) show all the documents stored in the document server 102 that are referenced in the selected document, 2) show all the documents stored in the document server 102 referencing this selected document, 3) delete the reference to this selected document in another document stored in the document server 102, and 4) insert a new reference to the selected document in another document stored in the document server 102. The user may locate referencing documents by querying the document server 102 to identify referencing documents. For example, the document server 102 may search for referencing documents by searching for tags previously created in a step similar to step 212 described below.

In step 212, the document server 102 allows the user to format the selected document to identify the selected document in multiple ways such as: 1) the location of the selected document in the overall organization of the document server, 2) the category of the selected document, 3) the keywords by which to search for the selected document, 4) the documents in the document server 102 to reference, 5) the documents in the document server 102 that reference the selected document, 6) creation of the table of content for the selected document, and 7) creation of image maps for the selected document. Thus step 212 allows users to manage the organization of documents stored in document server 102.

In step 214, the personal computer 106 stores the selected document to the document server 102.

Second Embodiment

Figure 3:
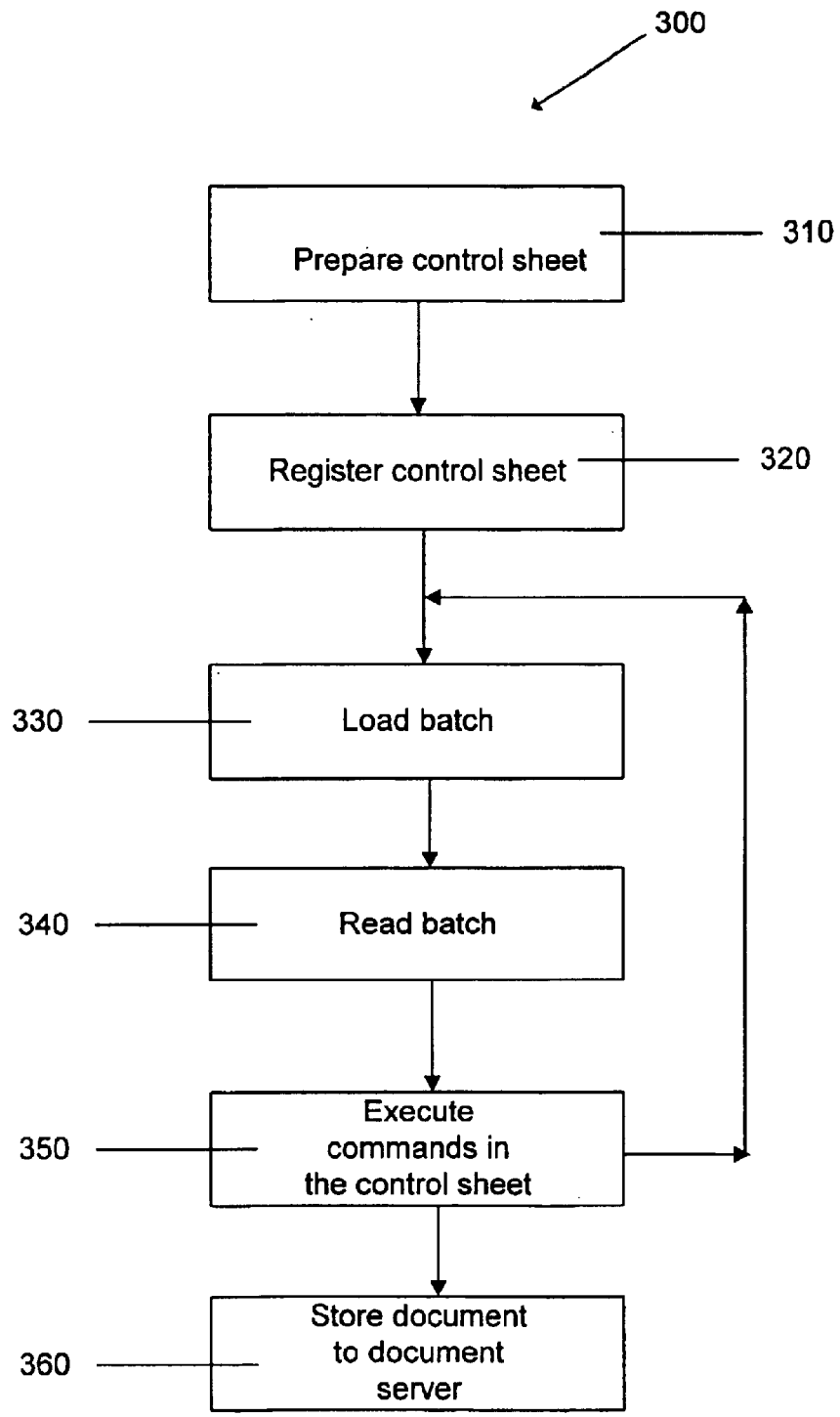
FIG. 3 depicts a process 300 in accordance with an embodiment of the present invention.
Figure 4:
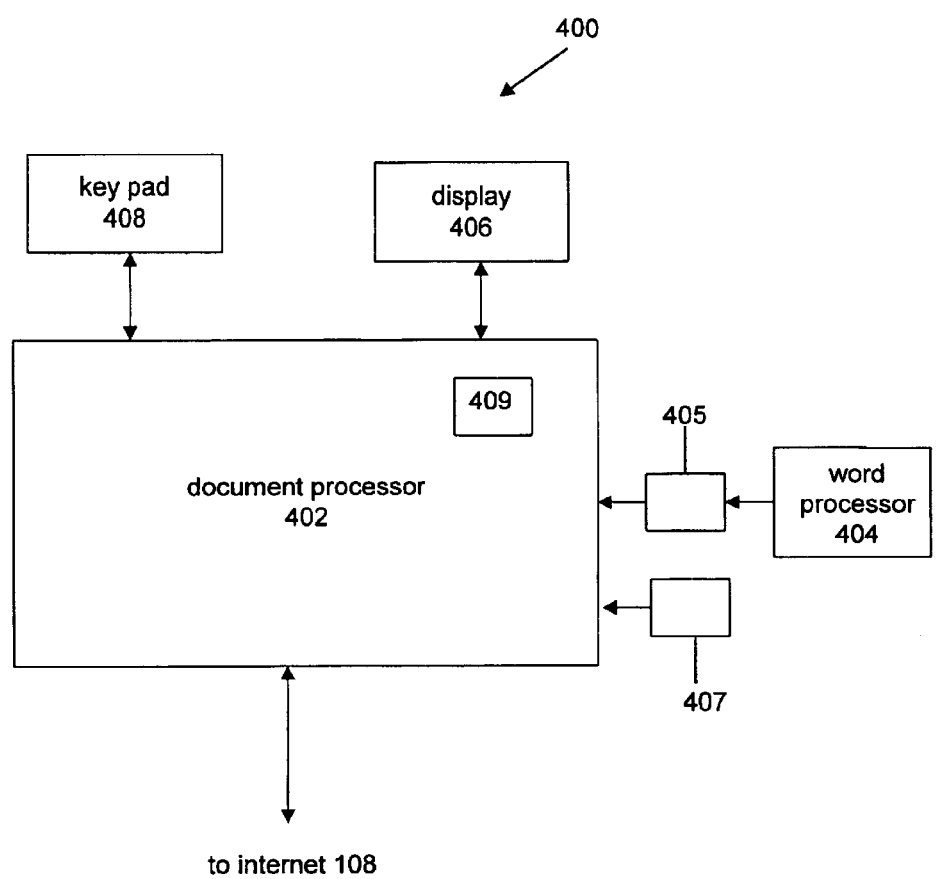
FIG. 4 depicts in block diagram form a suitable document management system 400 that performs the process 300 in accordance with an embodiment of the present invention.

A second embodiment of the present invention uses system 100 described earlier, except the personal computer 106 of system 100 may be replaced with the document management system 400 described with respect to FIG. 4, to perform an embodiment of the present invention described with respect to FIG. 3. Steps 310 to 360 of process 300 may be implemented as software, hardware, or firmware, or any combination thereof.

FIG. 4 depicts in block diagram form a suitable document management system 400. Document processor 402 is any conventional document processor, such as a copying machine having a display device, memory, ability to connect to the Internet, and that is adapted to perform process 300 described in more detail below with respect to FIG. 3.

Like personal computer 106 of the embodiment described with respect to process 200, document processor 402 accesses document server 102 using the network 108 and allows users to modify or store documents on document server 102. In this embodiment, a user creates "control sheets" 405, printed onto physical paper, using a conventional word processor 404. The control sheets include commands recognizable by the document processor 402. The document processor 402 reads the control sheets 405 to determine whether and how to modify documents stored on the document server 102 or whether to create documents.

Referring to FIG. 3, in step 310, a user prepares a control sheet 405 using, for example, word processor 404 and prints the control sheet 405 onto physical paper. This control sheet 405 includes commands that the user expects to subsequently use such as the functions described earlier with respect to step 210 of FIG. 2.

In step 320, the user provides the control sheet 405 to the document processor 402 for scanning. The document processor 402 extracts commands from the control sheet using, for example, optical character recognition (OCR). The document processor 402 then displays the commands using a display device 406 and the user verifies the commands were properly read and corrects characters or commands where applicable using, for example, an electronic key pad 408. The document processor 402 stores the commands of the registered control sheet 405 into its memory. Step 320 trains the document processor 402 to recognize commands that the user expects to use.

In step 330, the user stacks a control sheet on top of a sheet with printed content ("content sheet" 407) (collectively, "batch") and provides the batch to the paper loading tray of the document processor 402. In this embodiment, each control sheet includes printed commands that are associated with information printed on a content sheet 407. For example, the content sheet 407 may include a picture and the associated control sheet 405 includes commands to create a new document with the picture positioned in a particular location on the document as viewed. As another example, the content sheet 407 may include a text Web site address and the associated control sheet identifies the text Web site address as a hyperlink to be positioned at a specific location on a Web page. Multiple batches can be loaded into the paper loading tray of the document processor 402.

In step 340, the user instructs the document processor 402 to scan the batch. The document processor 402 scans the contents of the batch into a buffer or memory 409 as a graphics file. The document processor 402 stores other information related to the batch such as scan date, scan time, user, and machine used. The document processor 402 also applies conventional image cleaning programs to sharpen the stored images for better accuracy or to correct for skew if necessary. The document processor 402 further applies a conventional optical character recognition program to extract information from the content sheet and control sheet, such as the location of text in the content sheet 407 and the location of graphics in the content sheet 407.

In step 350, the document processor 402 executes the commands most recently read from a control sheet 405. For example, where a new document is to be created, the document processor 402 uses a conventional technique to create an empty HTML file, then includes the content identified in a content sheet at the desired position on the document (as viewed) and then formats the document, as in step 212 of process 200, in accordance with the commands in the control sheet 405, and then stores the document to the document server 102. In another example, the document processor 402 loads and modifies a document stored by the document server 102 according to the commands of the control sheet 405 by adding content, in the associated content sheet, to the identified document.

Steps 330 to 350 repeat until no more batches are present in the paper tray of the document processor 402.

In step 360, the document management system 400 stores the document to memory 104 of document server 102.

In a third embodiment of the present invention, the control sheet and content sheet may be in electronic form thereby eliminating the use of steps 320 and 330 of process 300.

Modifications

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer implemented method for processing a Web document for storage on a Web document server, the method comprising the steps of:

reading a printed control sheet which includes at least one command;

reading a printed content sheet which includes content to be added to or modified on the Web document;

determining whether to a create a new Web document or to modify an existing Web document based on the commands on the printed control sheet;

creating or modifying the Web document in accordance with the commands on the printed control sheet and the content on the printed content sheet; and storing the created or modified Web document on the Web document server.

2. The method according to claim 1, wherein the control sheet includes the command to create the Web document with the content positioned in a particular location on the Web document, and wherein the content is included on the content sheet.

3. The method according to claim 1, wherein the control sheet includes the command to identify on the content sheet a text Web site address as a hyperlink to be added at a specific location on the Web document.

4. A computer implemented method for processing a Web document for storage on a Web document server, the method comprising the steps of:

reading a control sheet which includes at least one command;

reading a content sheet which includes content to be added to or modified on the Web document;

determining whether to create a new Web document or to modify an existing Web document based on the commands on the control sheet;

creating or modifying the Web document in accordance with the commands on the control sheet and the content on the content sheet; and storing the created or modified Web document on the Web document server;

wherein the control sheet includes the command to create the Web document with the content of the content sheet positioned in a particular location on the Web document and the command to identify on the content sheet a text Web site address as a hyperlink to be added at a specific location on the Web document.

5. A document management system for processing a Web document for storage on a Web document server in accordance with a printed control sheet and a printed content sheet, the document management system comprising:

a document processor for recognizing at least one command included on the printed control sheet, for recognizing content included on the content sheet, for determining whether to create a new document or modify an existing document based on the commands on the control sheet, for creating or modifying the Web document in accordance with the recognized commands and the recognized content, and for storing the created or modified Web document on the Web document server.

6. A document management system for processing a Web document for storage on a Web document server in accordance with a printed control sheet and a printed content sheet, the document management system comprising:

a document processor for recognizing at least one command included on the printed control sheet, for recognizing content included on the content sheet, for determining whether to create a new document or modify an existing document based on the commands on the control sheet, for creating or modifying the Web document in accordance with the recognized commands and the recognized content, and for storing the created or modified Web document on the Web document server;

wherein the control sheet includes the command to create the Web document with the content of the content sheet positioned in a particular location on the Web document and the command to identify on the content sheet a text Web site address as a hyperlink to be added at a specific location on the Web document.

7. A computer-readable medium storing a computer executable procedure for processing a Web document for storage on a Web document server, the procedure comprising the steps of:

reading a printed control sheet which includes at least one command;

reading a printed content sheet which includes content to be added to or modified on the Web document;

determining whether to create a new Web document or to modify an existing Web document based on the commands on the printed control sheet;

creating or modifying the Web document in accordance with the commands on the printed control sheet and the content on the printed content sheet; and storing the created or modified Web document on the Web document server.

8. A computer-readable medium storing a computer executable procedure for processing a Web document for storage on a Web document server, the procedure comprising the steps of:

reading a control sheet which includes at least one command;

reading a content sheet which includes content to be added to or modified on the Web document;

determining whether the Web document is to be created or modified based on the commands on the control sheet;

creating or modifying the Web document in accordance with the commands on the control sheet and the content on the content sheets; and storing the created or modified Web document in the Web document server;

wherein the control sheet includes the command to create the Web document with the content of the content sheet positioned in a particular location on the Web document and the command to identify on the content sheet a text Web site address as a hyperlink to be added at a specific location on the Web document.

9. The method according to claim 1, wherein said determining step determines that an existing Web document is to be modified, further comprising the step of retrieving the existing Web document from the Web document server.

10. The method according to claim 4, wherein said determining step determines that an existing Web document is to be modified, further comprising the step of retrieving the existing Web document from the Web document server.

11. The system according to claim 5, wherein said determining module determines that an existing Web document is to be modified, the document processor further comprising a module for retrieving the existing Web document from the Web document server.

12. The system according to claim 6, wherein said determining module determines that an existing Web document is to be modified, the document processor further comprising a module for retrieving the existing Web document from the Web document server.

13. The medium according to claim 7, wherein said determining step determines that an existing Web document is to be modified, the procedure further comprising the step of retrieving the existing Web document from the Web document server.

14. The medium according to claim 8, wherein said determining step determines that an existing Web document is to be modified, the procedure further comprising the step of retrieving the existing Web document from the Web document server.

* * * * *